US007523535B2

(12) United States Patent
Coleman et al.

(10) Patent No.: US 7,523,535 B2
(45) Date of Patent: Apr. 28, 2009

(54) RAILCAR TRUCK BOLSTER SIDE BEARING MOUNTING PAD MILLING MACHINE AND METHOD

(75) Inventors: Ronald Coleman, Orient, OH (US); Bruce Milligan, Pataskala, OH (US)

(73) Assignee: Columbus Steel Castings Company, Columbus, OH (US)

( * ) Notice: Subject to any disclaimer, the term of this patent is extended or adjusted under 35 U.S.C. 154(b) by 237 days.

(21) Appl. No.: 11/280,650

(22) Filed: Nov. 16, 2005

(65) Prior Publication Data

US 2007/0110532 A1 May 17, 2007

(51) Int. Cl.
*B23C 3/00* (2006.01)
(52) U.S. Cl. .................. 29/557; 409/212; 409/163; 409/197; 409/220; 409/192; 269/296; 269/305
(58) Field of Classification Search ................ 409/202, 409/212, 192, 203, 213, 217, 158, 163, 197, 409/205, 219, 220, 225; 269/296, 305, 32, 269/152, 291, 238, 236; 29/557–558
See application file for complete search history.

(56) References Cited

U.S. PATENT DOCUMENTS

| 509,824 | A | * | 11/1893 | Price, Jr. | 409/212 |
|---|---|---|---|---|---|
| 765,447 | A | * | 7/1904 | Van Norman | 409/212 |
| 1,556,852 | A | * | 10/1925 | La Ducer | 409/212 |
| 1,968,520 | A | * | 7/1934 | Hanitz | 409/212 |
| 3,000,674 | A | * | 9/1961 | Ford | 384/44 |
| 4,677,726 | A | * | 7/1987 | Williams | 409/192 |
| 6,158,728 | A | * | 12/2000 | Smith | 269/99 |
| 6,993,821 | B2 | * | 2/2006 | Ahti et al. | 269/297 |
| 2002/0131836 | A1 | * | 9/2002 | Ferrari et al. | 409/212 |

OTHER PUBLICATIONS

A letter submitted Sep. 29, 2008 regarding an Attorney of Record's observation of an existing machine.

* cited by examiner

*Primary Examiner*—Erica E Cadugan
(74) *Attorney, Agent, or Firm*—Standley Law Group LLP

(57) ABSTRACT

A railcar truck bolster side bearing mounting pad milling machine and method. A milling machine of the present invention includes a pair of milling heads and associated cutters suspended from an overhead frame member. A sliding saddle unit is provided for transporting the bolster into and out of a work envelope of the milling machine. At least one fixturing assembly is attached to the sliding saddle unit to support and fix the position of the bolster in three directions. The bolster is rigidly supported from its underside, thereby eliminating the risk that the bolster may move downward during machining. Since the vertical position of the bolster when presented to the cutters is fixed, thereby the need to raise the bolster into a working position is also eliminated.

27 Claims, 6 Drawing Sheets

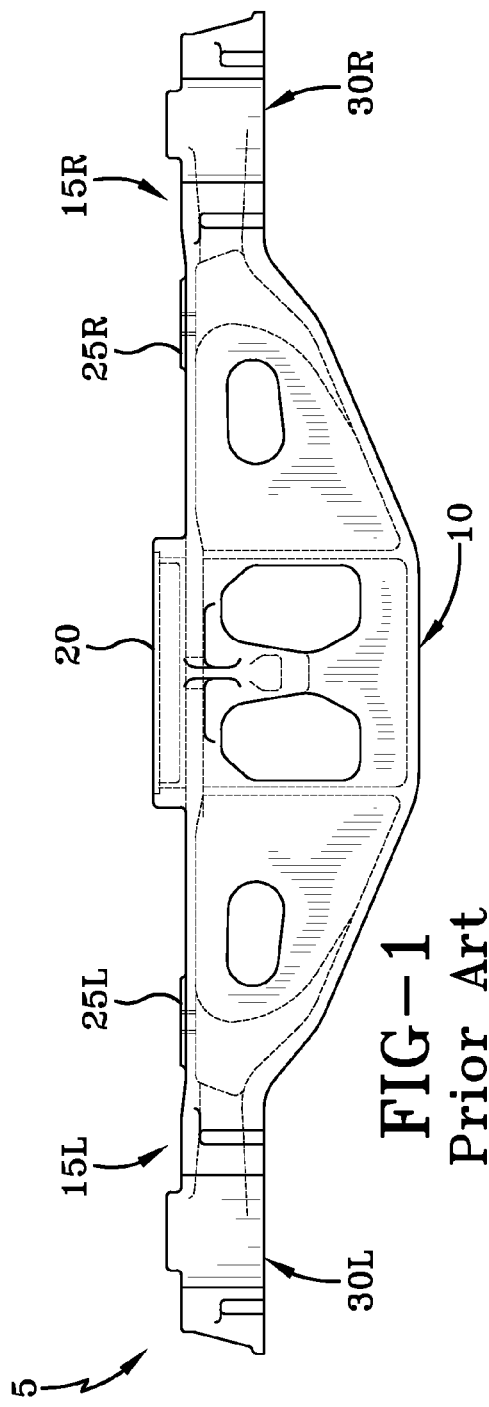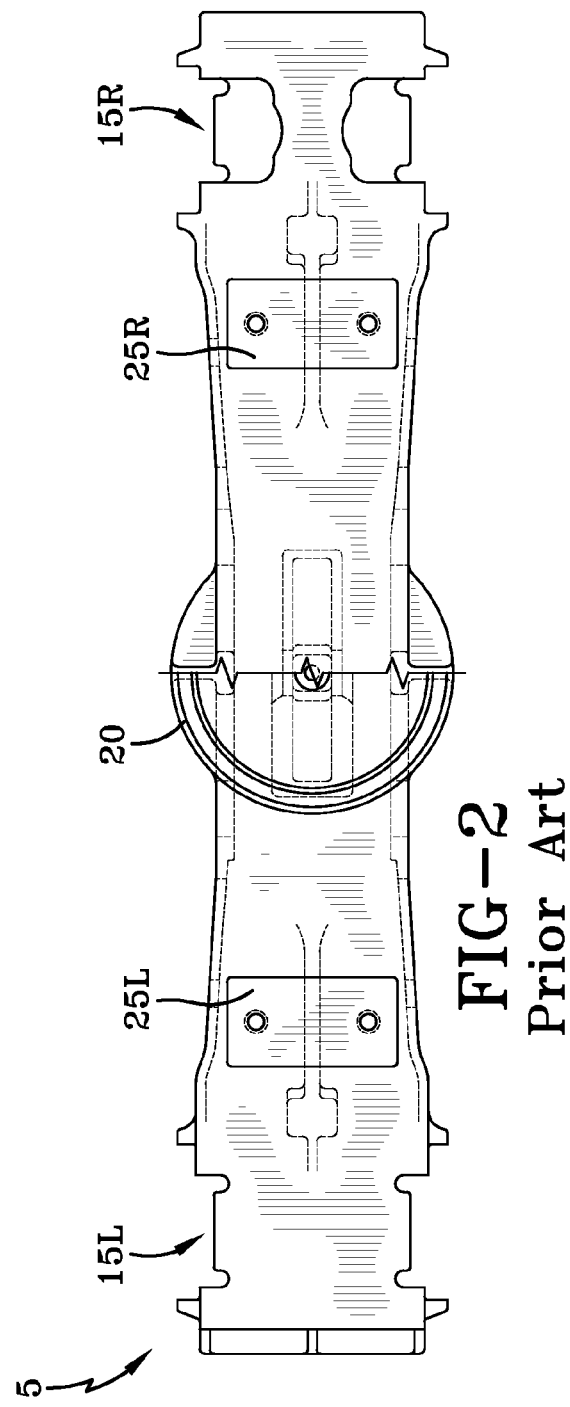

RAILCAR TRUCK BOLSTER SIDE BEARING MOUNTING PAD MILLING MACHINE AND METHOD

BACKGROUND OF THE INVENTION

The present invention is directed to a milling machine for cutting the side bearing pads of a railcar truck bolster. More particularly, the present invention is directed to a milling machine that is capable of precisely and repeatedly machining the side bearing mounting pads of a cast railcar truck bolster.

A railcar rides on and is supported by what is known as a railcar truck. Commonly, there are two trucks per railcar. Each truck generally includes two elongated and transversely spaced side frames that rest on corresponding wheel sets provided to engage a set of train tracks. An elongated truck bolster (bolster) typically extends substantially perpendicularly between, and is connected to, the pair of side frames. Normally, the bolster is supported on the side frames by a number of springs that serve to provide the railcar and its cargo with a cushioned ride. The springs reside between the side frames and a spring seat area on the underside of the bolster.

The bolster connects each truck to the railcar, and is generally provided on its top surface with a connecting member for this purpose. The bolster is also provided on its top surface with a pair of side bearing mounting pads that are normally substantially equidistantly spaced from and reside on opposite sides of the midpoint of the bolster. The side bearing mounting pads are provided to receive a shock absorbing side bearing assembly that resists and cushions rocking of the railcar as it negotiates curves and/or traverses bumpy sections of track.

Railcar bolsters are typically cast members. As such, certain areas of such a bolster, such as those designed to receive mating components or to fit precisely with another truck or railcar element, will typically require machining after casting. Such is the case with the side bearing mounting pads.

The side bearing mounting pads serve not only to secure the side bearing assemblies to the bolster, but also to locate the side bearing assemblies with respect to the underside of the railcar. As such, it is desired not only that the side bearing mounting pads be machined to a flat and level surface, but also that they be machined to a precise height with respect to some reference point or surface on the bolster. This is desired to ensure that the side bearing assembly will properly contact the underside of the railcar once the railcar has been secured to the truck. For example, if an excessive amount of material is removed from a side bearing mounting pad, there may be a gap between the side bearing assembly affixed thereto and the underside of the railcar—which may lead to an undesirable impacting of the railcar with the side bearing assembly when the railcar negotiates curves or encounters a rough section of track. In contrast, the removal of an inadequate amount of material from a side bearing mounting pad may make it difficult or impossible to properly fit the side bearing assembly between the top of the bolster and the underside of the railcar.

Known machines for milling railcar bolster side bearing mounting pads have proven incapable of continually providing precise and repeatable results. Rather, wear problems inherent to the design of these known machines eventually causes the side bearing mounting pads to be machined out of tolerance—unless certain components of the machines are frequently replaced, or the bolsters are shimmed or otherwise manipulated into proper position when in the machines.

More specifically, known railcar side bearing mounting pad milling machines typically raise the bolster into a working position for engagement by a milling head(s) and associated cutter(s). The bolster is typically raised to a predetermined position and held in place, commonly against a stop, while the cutters machine the side bearing mounting pads. This technique is problematic for multiple reasons. First, both gravity and the downward pressure exerted by the milling heads against the side bearing mounting pads act against the lifting mechanism responsible for raising the bolster. Thus, it is difficult to maintain the bolster in the exact position necessary to allow for milling the pads precisely to the required depth. Second, repeated impact between the top surface of the bolster and the overlying hard stops produces excessive wearing of the hard stops. Any wear of the hard stops will, of course, allow the side bearing mounting pads to be located to an incorrect height with respect to the milling heads. Further, the hard stops may experience dissimilar amounts of wear, thereby allowing the side bearing mounting pads to be milled to different heights.

Consequently, it can be understood that there is a need for an apparatus that is better able to ensure that the side bearing mounting pads are always precisely and repeatedly located prior to the machining thereof. A side bearing milling machine of the present invention satisfies this need.

SUMMARY OF THE INVENTION

A side bearing milling machine of the present invention incorporates a highly rigid, moveable saddle and fixture assembly, that allows the bolster to be supported from its underside. More specifically, the bolster is supported in an upright position within the fixture by the spring seats located near each end of the bolster. Once properly positioned within the fixture, the bolster is then securely clamped to prevent its movement. Downward clamping force presses the spring seats against the underlying fixture, thereby ensuring the accurate and repeated positioning of the bolster and the side bearing mounting pads.

Once the bolster is properly positioned and clamped within the fixture, the sliding saddle unit may be moved into the machine along a set of linear guide ways. For example, the sliding saddle unit may be moved by means of a hydraulic cylinder. Machining of the side bearing mounting pads may be accomplished in several ways. Preferably, machining of the side bearing mounting pads is accomplished in a single pass, with the sliding saddle unit feeding the pads through properly positioned cutters. Alternatively, it is contemplated that the bolster and side bearing mounting pads may be moved back-and-forth under the cutters by the sliding saddle unit, or that the milling heads may be moved back-and-forth over the side bearing mounting pads. In these latter two embodiments, adjustments to the vertical position of the milling heads would also be required between passes.

A side bearing milling machine of the present invention allows for more precise and repeatable locating of a railcar truck bolster than has been capable with previously known machines. Supporting the bolster from underneath prevents gravity and/or the downward forces exerted by the milling heads to displace the bolster and side bearing mounting pads during the machining process. Further, by eliminating the need to raise the bolster into proper cutting position, the wear problem associated with such a design has been obviated. Consequently, a side bearing milling machine of the present invention allows the side bearing mounting pads of a railcar truck bolster to be repeatedly machined to a precise tolerance, without requiring the frequent replacement of positioning components or the adjustment of bolster position that has typically accompanied the use of known machines.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 is a front elevation view of a typical railcar truck bolster;

FIG. 2 is a top plan view of the bolster of FIG. 1;

DETAILED DESCRIPTION OF THE EXEMPLARY EMBODIMENT(S)

A typical railcar bolster is illustrated in FIGS. 1-2. As can be seen, the bolster 5 is basically an elongated member having a widened center portion 10 from which extends a pair of bolster arms 15L, 15R. In operation, the center portion 10 sits beneath and substantially along the midline of a railcar. A connecting element 20 is provided to facilitate attachment of the railcar to the bolster 5.

A top surface of each bolster arm 15L, 15R, can be seen to include a side bearing mounting pad 25L, 25R. In the embodiment of the bolster 5 shown in FIGS. 1-2, the side bearing mounting pads 25L, 25R are located approximately midway between the center portion 10 and the distal end of the bolster arms 15L, 15R, although this position may vary. A spring seat 30L, 30R lies along a bottom surface of each bolster arm 15L, 15R, and near the distal end thereof. The spring seats 30L, 30R abut the tops of the springs that reside between each end of the bolster arm 5 and the side frames (not shown) forming the railcar truck.

The side bearing mounting pads 25L, 25R serve as an attachment surface for mounting shock absorbing side bearing assemblies to the bolster 5. As can be best observed in FIG. 2, the side bearing mounting pads 25L, 25R extend upward some distance from the top surface of the bolster arms 15L, 15R after casting. However, the top surface of each side bearing mounting pad 25L, 25R must be subsequently machined after casting to ensure a flat and properly located surface for mounting the side bearing assemblies. As described above, it is desirable that the finished surface of each side bearing mounting pads 25L, 25R be not only flat, but also located a precise distance from some predetermined reference point on the bolster. This ensures that the subsequently installed side bearing assemblies will properly support and cushion the railcar during operation.

Figure 3:
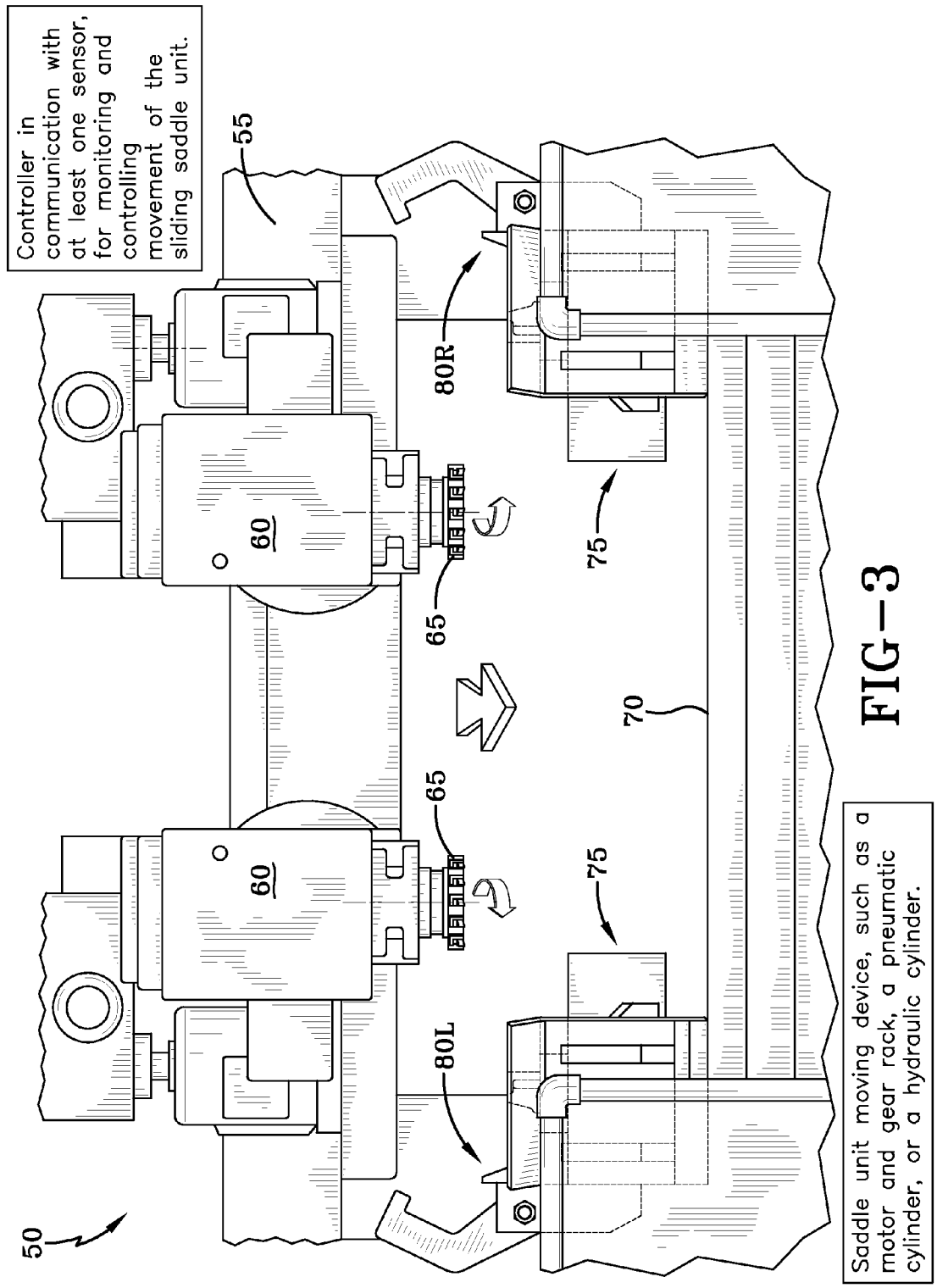
FIG. 3 is a perspective view of one embodiment of a side bearing milling machine of the present invention.

A perspective view of one embodiment of a side bearing mounting pad milling machine (milling machine) 50 of the present invention is depicted in FIG. 3. As shown, the milling machine 50 includes a frame 55 that supports, among other things, a pair of overhead milling heads 60 and associated face mills (cutters) 65. An operator's platform 70 allows for access to a sliding saddle unit 75 that supports left and right bolster fixturing assemblies 80L, 80R. The sliding saddle unit 75 is used to transport the bolster 5 into and out of the work envelope of the milling machine 50. As would be understood by one skilled in the art, the milling heads 60 and associated cutters 65 are operative to machine the top surface of the side bearing mounting pads 25L, 25R when brought into contact therewith by movement of the sliding saddle unit 75.

Figure 4:
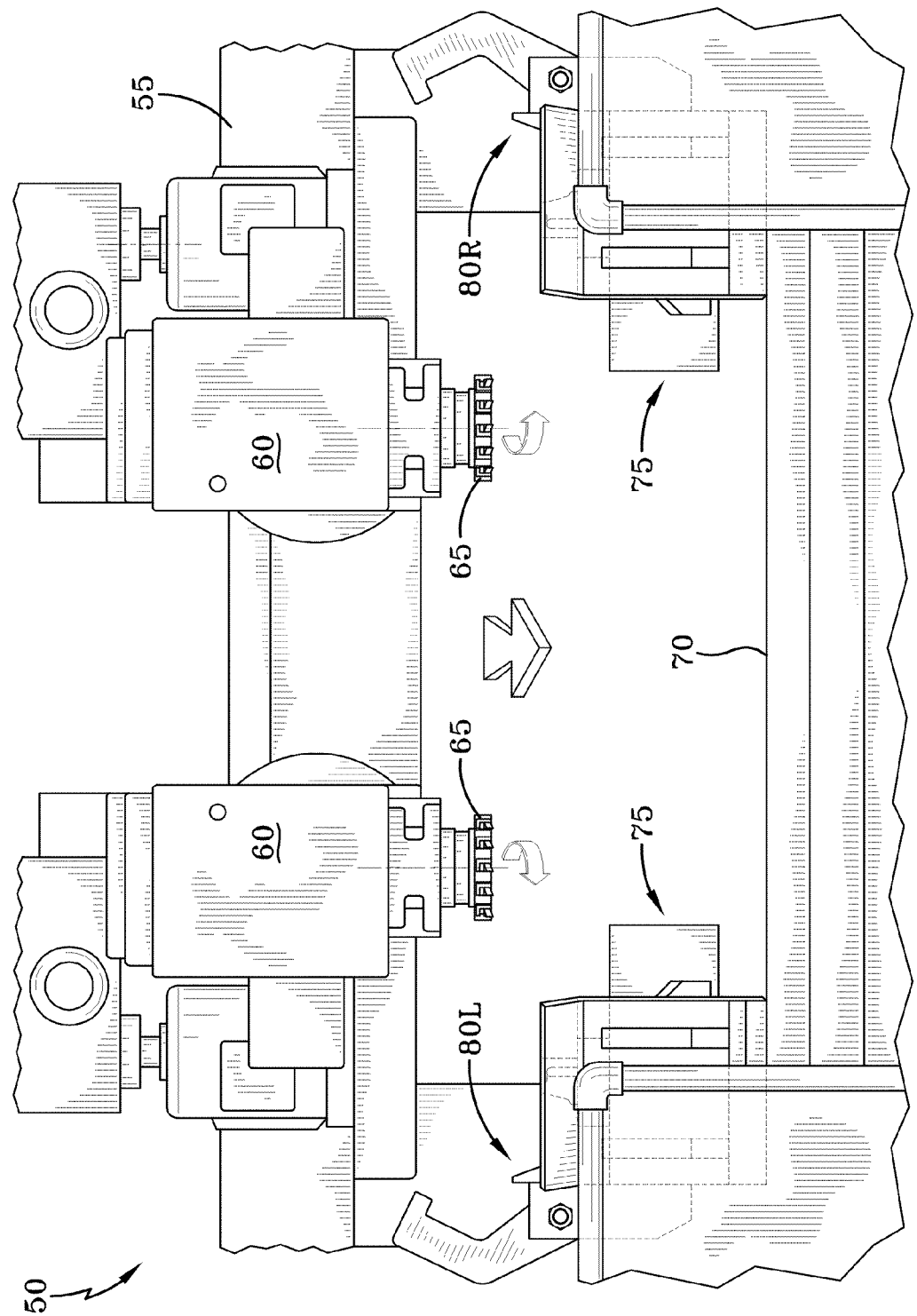
FIG. 4 is a front view of the side bearing milling machine of FIG. 3, wherein a bolster is shown loaded into a sliding saddle unit that is designed to position and transfer the bolster into and out of the work envelope of the milling machine.

FIG. 4 better illustrates a visible portion of a sliding saddle unit 75 referred to above. The sliding saddle unit 75 is basically a rigid frame designed to support a bolster 5 and to move the bolster into and out of the work envelope of the milling machine 50 so that the side bearing mounting pads 25L, 25R may be machined. In the particular embodiment shown, the sliding saddle unit 75 rides on a subjacent set of linear guide ways (not visible) that are set into the floor or affixed to a base portion of the milling machine 50.

Movement of the sliding saddle unit 75 may be accomplished by various means, schematically and collectively represented in FIG. 3. For example, the sliding saddle unit 75 may be moved by means of a motor and gear rack or a pneumatic or hydraulic cylinder. In one particular embodiment of the present invention, movement of the sliding saddle unit 75 is accomplished by means of a hydraulic cylinder. A feedback sensor(s) may be further provided on the sliding saddle unit 75 or on/in the movement generator (e.g., hydraulic cylinder) in order to report the position of the sliding saddle unit and bolster to the PLC or other controller associated with the milling machine 50.

In order to properly locate, orient and support the bolster 5 for machining of the side bearing mounting pads 25L, 25R, one or more bolster fixturing assemblies 80L, 80R are affixed to the sliding saddle unit 75. A pair of these assemblies is shown affixed to the sliding saddle unit 75 in FIG. 4. The fixturing assemblies 80L, 80R are adapted to receive, position and secure the bolster to the sliding saddle unit 75. Although a pair of fixturing assemblies 80L, 80R are shown to be affixed to the sliding saddle unit 75 in the exemplary embodiment depicted herein, it should be realized that any number of such assemblies may be employed—as long as the bolster 5 can be properly located and secured for machining.

Figure 5:
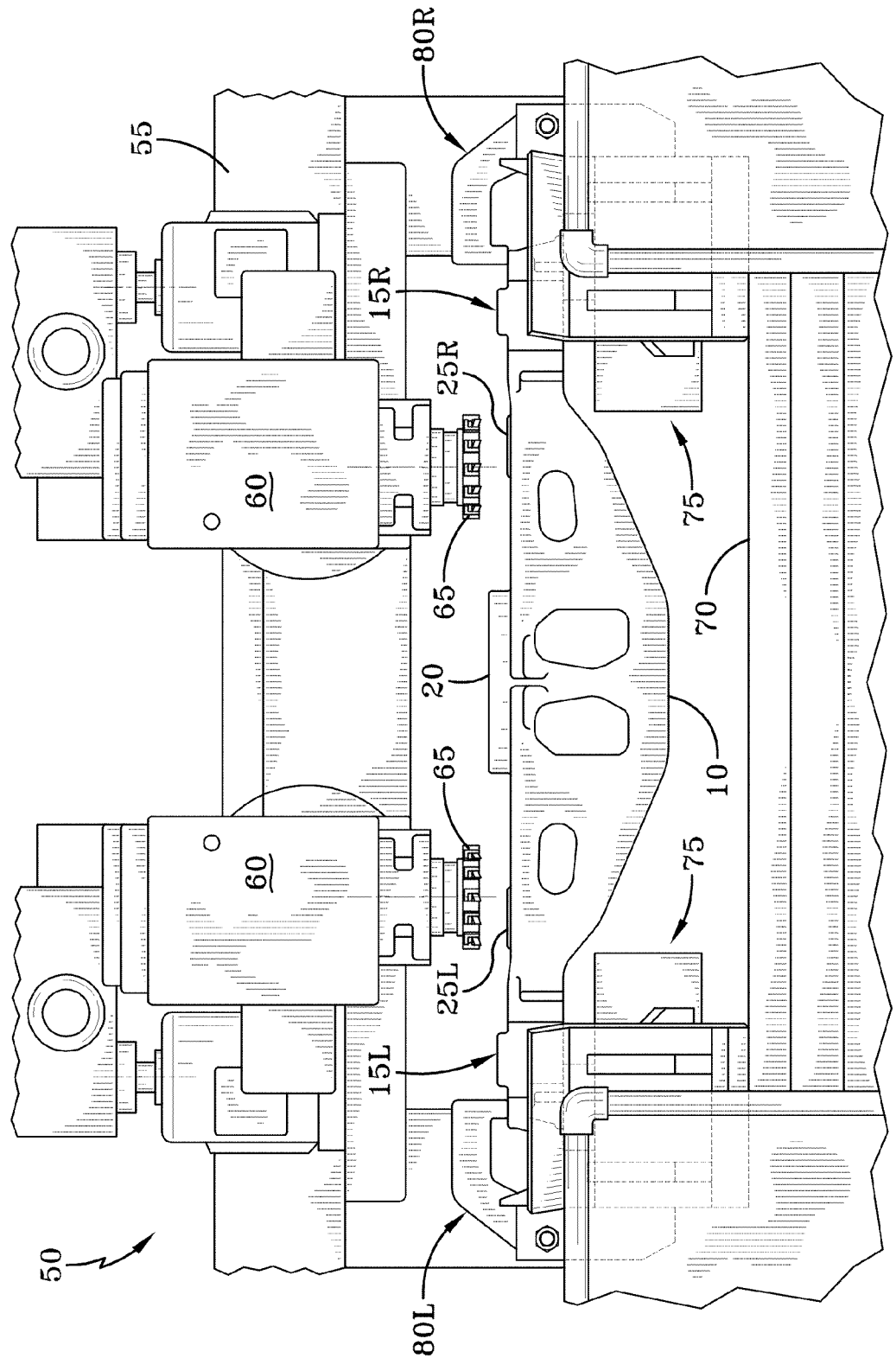
FIG. 5 is an enlarged perspective view of a bolster fixturing assembly that is affixed to the sliding saddle unit of FIG. 4.

An enlarged view of an exemplary fixturing assembly 80 is shown in more detail in FIG. 5. The fixturing assembly 80 can be seen to include a support means, which in this particular embodiment comprises a support base 85, a bolster locating element 90, a longitudinal hard stop 95, and a pair of lateral hard stops 100, 105.

In this embodiment, the support base 85 acts as a riser that allows the bolster 5 to naturally rest in an upright position (as shown in FIG. 1) when placed on the sliding saddle unit 75. In this position, the side bearing mounting pads 25L, 25R are properly oriented to be contacted by the cutters 65. The support base 85 may be of various design, but should be sufficiently rigid to resist deflection or other movement when supporting a bolster 5. The bolster locating element 90 is affixed to the support base 85 in a manner that allows its contact with the underside of the bolster 5 when the bolster is loaded onto the sliding saddle unit 75. In the particular embodiment shown, the bolster locating element 90 resides on the upper surface of the support base 85 and abuts the spring seat area 30R of the overlying bolster arm 15 to which it will correspond. Therefore, it can be understood that the bolster is rigidly supported in a fixed vertical position from an underside portion thereof.

The bolster locating element 90 may be of various design. For example, the bolster locating element 90 may be a permanent part of the support base 85. Alternatively, and as shown, the bolster locating element 90 may comprise one or more modular components that can be removed and replaced. This allows for more flexibility, for example, if it is desired to at a different vertical position or if the bolster locating element 90 becomes damaged and must be replaced. The bolster locating element 90 can be of virtually any size and/or shape necessary to mate with the corresponding portion of the bolster 5. Whatever the design of the bolster locating element 90, however, the combination of the bolster locating element 90 and the support base 85 must form a solid support for the bolster 5.

Figure 6:
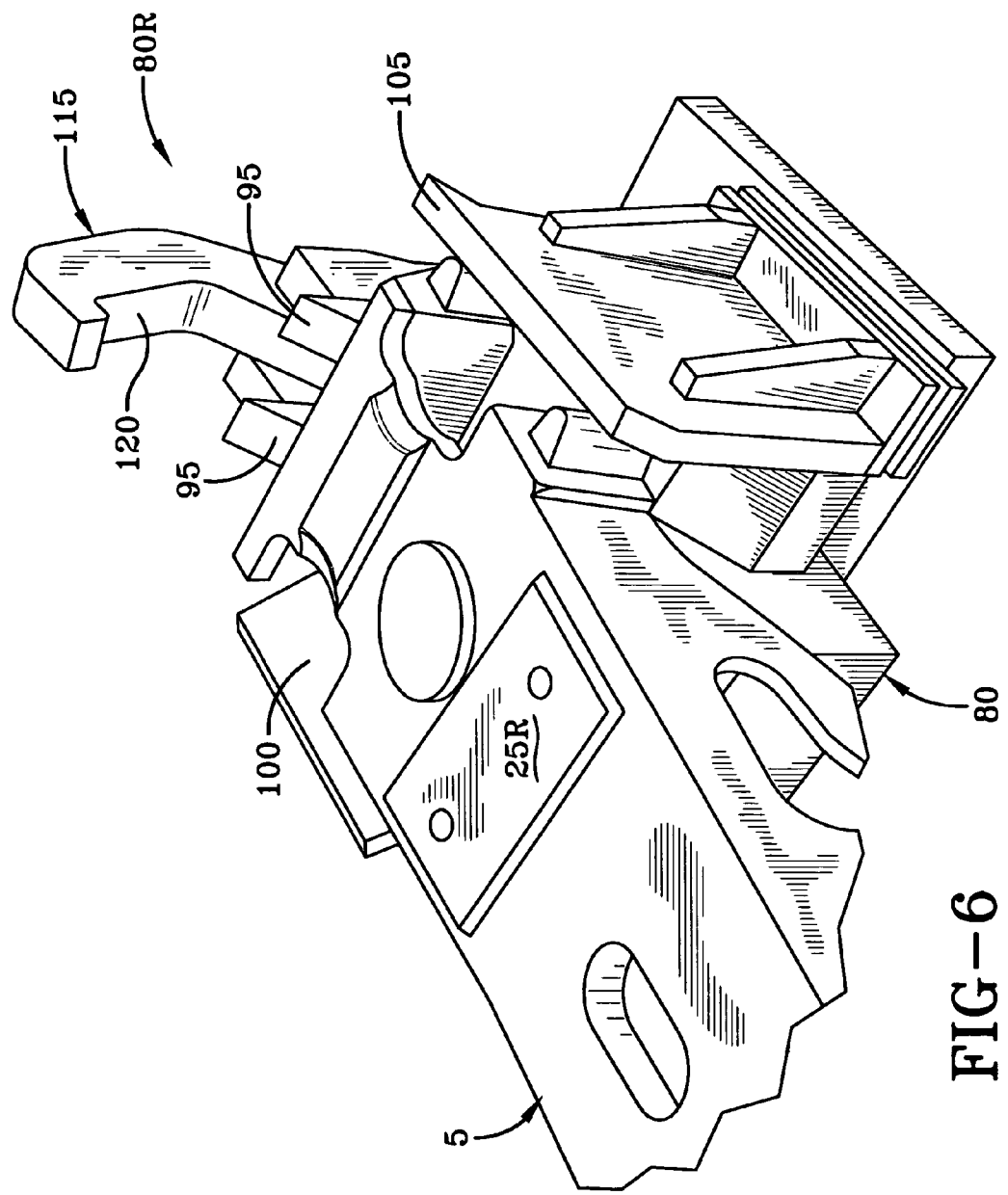
FIG. 6 shows a bolster installed to the fixturing assembly of FIG. 5.

As can be best observed in FIG. 6, a longitudinal hard stop 95 is positioned to locate the bolster 5 and to limit its longitudinal movement. That is, the longitudinal hard stop 95 is provided to limit movement of the bolster 5 that is transverse to the path of travel of the sliding saddle unit 75. When two fixturing assemblies 80L, 80R are used, corresponding longitudinal hard stops ensure that the side bearing mounting pads 25L, 25R are, and remain, properly aligned with the cutters 65 of the milling machine 50.

In the embodiment shown, lateral hard stops 100, 105 are positioned to reside on either side of a fixtured bolster 5, and similarly act to locate the bolster and to limit its lateral movement. That is, the lateral hard stops 100, 105 define the lateral position of the bolster 5 and prevent its movement in a direction that is parallel to the (inward or outward) path of travel of the sliding saddle unit 75.

Any of the longitudinal hard stop 95 or lateral hard stops 100, 105 may be chamfered or angled to facilitate reception of a bolster 5. Any of the longitudinal hard stop 95 or lateral hard stops 100, 105 may also include a locating element 110 of various type and position to more accurately locate a bolster 5 within its associated fixturing assembly 80.

Once the bolster 5 has been placed into the fixturing assemblies 80L, 80R of the sliding saddle unit 75, it is preferably secured in position by a clamping apparatus. Various clamping apparatus designs may be successfully employed for this purpose. Preferably, the clamping apparatus operates to secure the bolster 5 against the bolster locating element 90 and support base 85.

Figure 7:
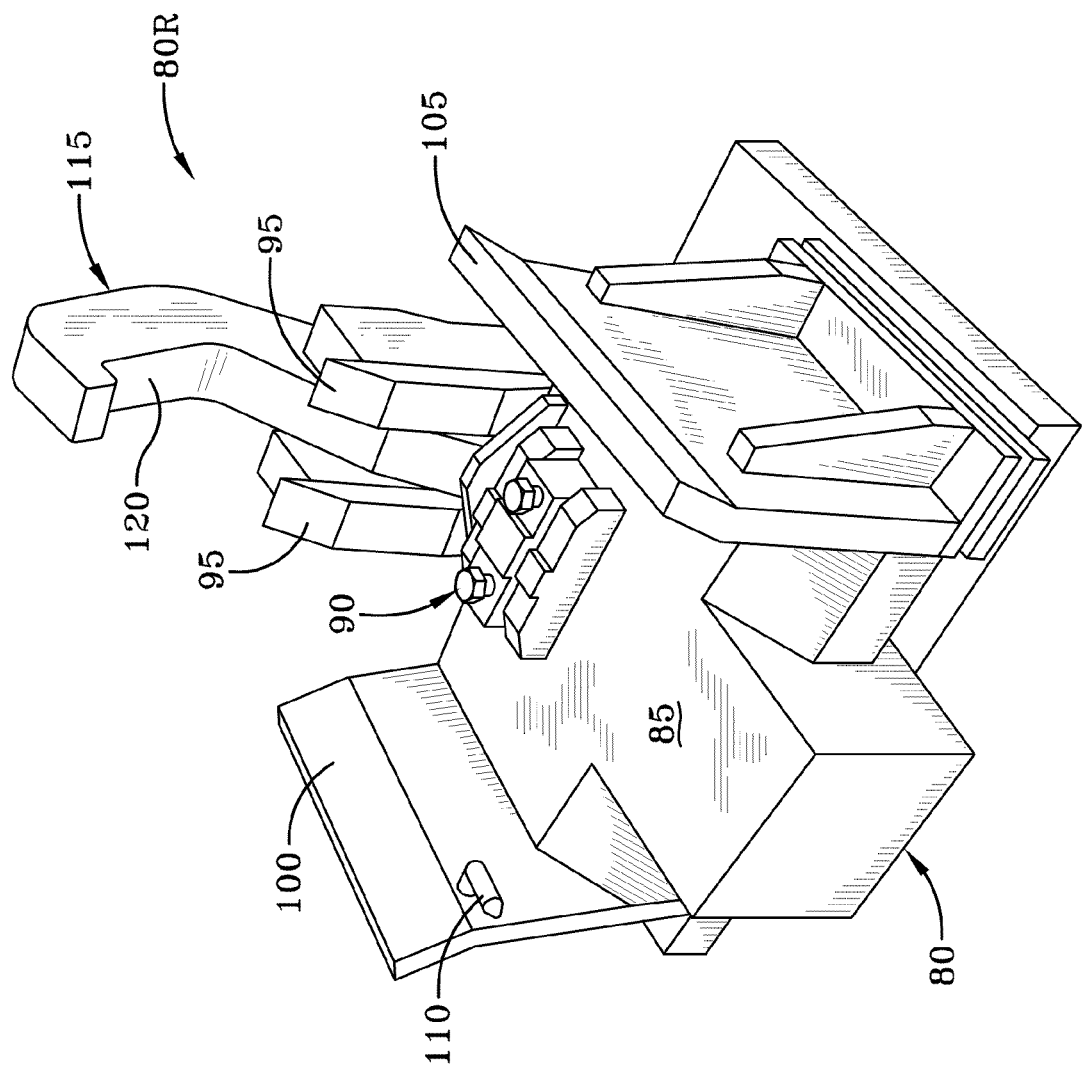
FIG. 7 shows the bolster of FIG. 6 securely clamped within the fixturing assembly.

In the exemplary embodiment shown in FIGS. 6-7, for example, the clamping apparatus 115 includes a pivoting clamp arm 120 that rotates downward from outward of the end of each bolster arm 15L, 15R and exerts a downward clamping force on a top surface of the bolster 5. This particular clamping arm 120 is driven by a hydraulic cylinder, although one skilled in the art would realize that other driving means are also possible.

With the bolster 5 residing within the fixturing assemblies 80L, 80R and the clamping apparatus 115 securely forcing the bolster against the bolster support means (e.g., bolster locating element 90 and underlying support base 85), it can be understood that the position of the bolster is thereby fixed in three dimensions. Further, the rigid frame of the sliding saddle unit 75 and the guide ways upon which it rides also ensures that the bolster 5 will always be presented to the cutters 65 in the same location.

Once the bolster 5 has been clamped to the fixturing assemblies 80L, 80R, the sliding saddle unit 75 moves the bolster into the work envelope of the milling machine 50 for machining of the side bearing mounting pads 25L, 25R. Because the fixturing assemblies 80L, 80R are positioned on the sliding saddle unit 75 to align the side bearing mounting pads 25L, 25R with the cutters 65, only a forward motion of the sliding saddle unit 75 is necessary.

In a preferred embodiment, the vertical position of the milling heads 60 and associated cutters 65 is preset to remove the desired amount of material from the side bearing mounting pads 25L, 25R, and machining occurs in one pass as the sliding saddle unit 75 moves the bolster 5 past the cutters. In this embodiment, the motion and position of the sliding saddle unit driving means (e.g., hydraulic cylinder) can preferably be carefully monitored and controlled by a PLC or other controller, shown schematically in FIG. 3, that oversees operation of the milling machine 50. As such, the feed rate of the side bearing mounting pads 25L, 25R through the cutters 65 can be precisely controlled. The milling heads may also be vertically displaceable to allow for differing machining depths.

Alternate embodiments of the present invention are also possible, however. For example, multiple-pass machining can be accomplished by using the sliding saddle unit 75 to repeatedly pass the bolster 5 under the cutters 65. In this embodiment, the vertical position of the milling heads 60 and cutters 65 is adjusted between passes. In yet another embodiment, it is possible to transfer the sliding saddle unit 75 and bolster 5 to a fixed position within the milling machine 5, and to move the milling heads 60 and cutters 65 over the side bearing mounting pads 25L, 25R.

Once machining of the side bearing mounting pads 25L, 25R is complete, the sliding saddle unit 75 is withdrawn from the work envelope of the milling machine 50, and the bolster 5 is unclamped and removed from the fixturing assemblies 80L, 80R. A new bolster 5 can then be quickly and easily loaded into the fixturing assemblies 80L, 80R and the process can be repeated.

While certain embodiments of the present invention are described in detail above, the scope of the invention is not to be considered limited by such disclosure, and modifications are possible without departing from the spirit of the invention as evidenced by the following claims:

What is claimed is:

1. A railcar bolster side bearing mounting pad milling machine, comprising:
  a frame;
  a pair of milling heads and associated cutters suspended from an overhead frame member;
  a sliding saddle unit moveable into and out of a work envelope beneath said cutters;
  a pair of fixturing assemblies for locating a bolster substantially in its normal operating orientation, said fixturing assemblies secured to said sliding saddle unit at substantially opposite ends thereof so as to receive therein opposing arm portions of a bolster while forming an open space therebetween to provide clearance for a downwardly extending central portion of said bolster, each fixturing assembly having a fixed position bolster support means for locating the position of said bolster in three dimensions; and
  each bolster support means including a plurality of bolster locating elements extending upward from a support base portion of the respective bolster support means to support fixtured bolsters from a repeatable location along a bottom surface thereof;
  wherein a pair of side bearing mounting pads present on a fixtured bolster are automatically aligned with and exposed to said cutters for machining as said sliding saddle unit is moved through said work envelope.

2. The milling machine of claim 1, wherein said milling heads are vertically adjustable.

3. The milling machine of claim 1, wherein said cutters are of sufficient diameter to machine said side bearing mounting pads in a single pass.

4. The milling machine of claim 1, wherein said sliding saddle unit is moved into and out of said work envelope by a device selected from the group consisting of a motor and gear rack, a pneumatic cylinder, and a hydraulic cylinder.

5. The milling machine of claim 1, wherein the sliding saddle unit is linearly guided through said work envelope.

6. The milling machine of claim 1, at least one of said bolster locating elements is removable.

7. The milling machine of claim 1, wherein said bottom surface of said bolster is a spring seat.

8. The milling machine of claim 1, wherein said fixturing assemblies each include at least one longitudinal hard stop for limiting movement of said bolster in a direction substantially transverse to the direction of travel of said sliding saddle unit.

9. The milling machine of claim 1, wherein said fixturing assemblies each include at least one lateral hard stop for limiting movement of said bolster in a direction substantially parallel to the forward or reverse direction of travel of said sliding saddle unit.

10. The milling machine of claim 1, wherein said fixturing assemblies each include at least one clamping apparatus for securing said bolster against said bolster locating elements.

11. The milling machine of claim 1, further comprising a programmable controller for monitoring and controlling movement of said sliding saddle unit.

12. The milling machine of claim 11, further comprising one or more sensors in communication with said programmable controller.

13. A railcar truck bolster side bearing mounting pad milling machine, comprising:
    a frame;
    a pair of milling heads and associated cutters suspended from an overhead frame member;
    a sliding saddle unit linearly moveable into and out of a work envelope beneath said cutters;
    a pair of fixturing assemblies for locating a bolster substantially in its normal operating orientation, said fixturing assemblies secured to said sliding saddle unit at substantially opposite ends thereof so as to receive therein opposing arm portions of a bolster while forming an open space therebetween to provide clearance for a downwardly extending central portion of said bolster, each fixturing assembly further comprising:
        a fixed position bolster support means for supporting and repeatably locating the vertical position of a fixtured bolster by engaging a spring seat located on an underside of an associated bolster arm portion of said bolster with a plurality of bolster support elements that extend upward from a support base portion of said bolster support means,
        hard stops of the bolster support means, the hard stops for fixing the horizontal position of said bolster, and
        a clamping apparatus for securing said bolster against said bolster support elements; and
    a programmable controller for monitoring and controlling movement of said sliding saddle unit and said cutters;
    wherein said pair of fixturing assemblies locates said bolster in three dimensions; and
    whereby a pair of side bearing mounting pads present on a top surface of a fixtured bolster are automatically aligned with and presented to said cutters for machining as said sliding saddle unit moves through said work envelope.

14. The milling machine of claim 13, wherein said milling heads are vertically adjustable.

15. The milling machine of claim 13, wherein said cutters are of sufficient diameter to machine said side bearing mounting pads in a single pass.

16. The milling machine of claim 13, wherein said sliding saddle unit is moved into and out of said work envelope by a device selected from the group consisting of a motor and gear rack, a pneumatic cylinder, and a hydraulic cylinder.

17. The milling machine of claim 13, wherein the sliding saddle unit is linearly guided through said work envelope.

18. The milling machine of claim 13, wherein at least one of said bolster locating elements is removable.

19. The milling machine of claim 13, further comprising one or more sensors in communication with said programmable controller.

20. A method for machining the side bearing mounting pads of a railcar truck bolster, comprising:
    providing a frame having a pair of milling heads and associated cutters suspended from an overhead frame member;
    providing a sliding saddle unit moveable into and out of a work envelope beneath said cutters;
    providing a pair of fixturing assemblies for locating said bolster substantially in its normal operating orientation, said fixturing assemblies secured to said sliding saddle unit at substantially opposite ends thereof so as to receive therein opposing arm portions of a bolster while forming an open space therebetween to provide clearance for a downwardly extending central portion of said bolster, each fixturing assembly having a fixed position bolster support means for locating the position of said bolster in three dimensions, each bolster support means including a plurality of bolster locating elements extending upward from a support base portion of the respective bolster support means to support fixtured bolsters from a repeatable location along a bottom surface thereof such that said side bearing mounting pads present on said bolster are automatically aligned with and exposed to said cutters as said sliding saddle unit is moved through said work envelope;
    setting said milling heads and cutters to a proper vertical position based on the fixtured location of said side bearing mounting pads; and
    moving said sliding saddle unit through said work envelope such that said cutters machine the surface of said side bearing mounting pads as said bolster passes by.

21. The method of claim 20, wherein said milling heads are vertically adjustable.

22. The method of claim 20, wherein said side bearing mounting pads are machined in a single pass.

23. The method of claim 20, wherein said sliding saddle unit is moved into and out of said work envelope by a device selected from the group consisting of a motor and gear rack, a pneumatic cylinder, and a hydraulic cylinder.

24. The method of claim 20, wherein said bolster is supported along a spring seat portion thereof.

25. The method of claim 20, further comprising clamping said bolster against said fixturing assemblies.

26. The method of claim 20, wherein movement of said sliding saddle unit is monitored and controlled by a programmable controller.

27. The method of claim 26, further comprising one or more sensors in communication with said programmable controller.

* * * * *